(12) United States Patent
Ota

(10) Patent No.: US 6,249,734 B1
(45) Date of Patent: Jun. 19, 2001

(54) NEUTRAL POSITION DETERMINATION METHOD FOR SPEED CHANGE GEAR SHAFT OF ELECTRICALLY OPERATED SPEED CHANGE GEAR

(75) Inventor: Atsuo Ota, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/350,151

(22) Filed: Jul. 9, 1999

(30) Foreign Application Priority Data

Oct. 7, 1998 (JP) .................................................. 10-211940

(51) Int. Cl.[7] ............................ G06F 17/00; G06F 19/00; G06F 7/00
(52) U.S. Cl. ................................ 701/51; 701/64; 701/110; 74/473.36
(58) Field of Search ................................... 701/51, 52, 64, 701/110, 121, 79; 74/473.36

(56) References Cited

U.S. PATENT DOCUMENTS 5,809,836 * 9/1998 Patzold et al. ....................... 74/337.5
6,027,179 * 2/2000 Arai ...................................... 303/11

FOREIGN PATENT DOCUMENTS 5-39865   2/1993   (JP) .

* cited by examiner

Primary Examiner—William A. Cuchlinski, Jr.
Assistant Examiner—Gertrude Arthur
(74) Attorney, Agent, or Firm—Birch, Stewart, Kolasch & Birch, LLP

(57) ABSTRACT

A neutral position determination method for a speed change gear shaft of an electrically operated speed change gear can accurately detect a rotational position of a speed change gear shaft without the necessity for a complicated assembling operation. The method includes a speed change gear shaft which is rocked to one side or the other side by a drive motor and an angle sensor for detecting a rotational angle of the speed change gear shaft for executing predetermined speed change control based on a rocking direction and a rocking angle from a neutral position of the speed change gear shaft. Furthermore, rotational angles of the speed change gear shaft when the speed change gear shaft is rocked to a rotational limit on the one side or the other side are detected, and a middle point of a rotational angle detected from the rotational limits of the one side and the other side is updated in registration as a neutral position of the speed change gear shaft.

12 Claims, 18 Drawing Sheets

PRESENT INVENTION

NEUTRAL POSITION DETERMINATION METHOD FOR SPEED CHANGE GEAR SHAFT OF ELECTRICALLY OPERATED SPEED CHANGE GEAR

DETAILED DESCRIPTION OF THE INVENTION

BACKGROUND OF THE INVENTION

1. Field of the Invention

The present invention relates to a neutral position determination method for a speed change gear shaft for an electrically operated speed change gear wherein gear shifting and connection or disconnection of a clutch are performed electrically. More particularly, the present invention relates to a neutral position determination method for a speed change gear shaft for an electrically operated speed change gear which performs predetermined speed change control based on a rocking direction and a rocking angle of the speed change gear shaft which is rocked by a drive motor.

2. Description of Related Art

While a conventional speed change gear performs gear shifting by operation of a clutch pedal (or a clutch lever) and a shift change lever, an electrically operated speed change gear which performs gear shifting making use of motor power is disclosed in the official gazette of Japanese Patent Laid-Open No. Hei-5-39865. Furthermore, it is possible to perform connection or disconnection of a clutch simultaneously using a motor.

In this instance, the speed change gear shaft is rotated by the drive motor, and connection or disconnection of the clutch is controlled in association with the speed change gear shaft. Furthermore, a sleeve is driven on a main shaft through a shift drum and a shift fork which operates in association with the speed change gear shaft so that the sleeve is engaged with a predetermined gear to establish a shift stage.

The operation timing must be determined based on a rotational angle of the speed change gear shaft. Therefore, when connection or disconnection of the clutch and rotation of the shift drum, etc. are performed in association with the speed change gear shaft, the rotational angle of the speed change gear shaft must be detected accurately.

If it is intended to represent the rotational position of the speed change gear shaft with a relative rotational angle from the middle position of the rocking motion of the speed change gear shaft, i.e., a neutral position, then mounting of an angle sensor or connection of an angle sensor and the speed change gear shaft or the like must be performed accurately so that an output voltage of the angle sensor when the speed change gear shaft is in a neutral position may indicate a predetermined value.

Furthermore, even if the angle sensor, etc. can be mounted accurately, if the sensitivity of the angle sensor is varied by a secular deterioration, then the rotational position of the speed change gear cannot be detected accurately.

SUMMARY OF THE INVENTION

It is an object of the present invention to provide a neutral position determination method for a speed change gear shaft for an electrically operated speed change gear which solves the problems of the prior art described above and can detect a rotational position of the speed change gear shaft accurately without the necessity for a complicated assembling operation.

In order to attain the above object, according to the present invention, a neutral position determination method for a speed change gear shaft for an electrically operated speed change gear including a speed change gear shaft which is rocked to one side or the other side by a drive motor and an angle sensor for detecting a rotational angle of the speed change gear shaft for executing predetermined speed change control based on a rocking direction and a rocking angle from a neutral position of the speed change gear shaft includes the following countermeasures.

(1) The rotational angles of the speed change gear shaft when the speed change gear shaft is rocked to a rotational limit on the one side or the other side are detected, and a middle point of a rotational angle detected from the rotational limits of the one side and the other side is updated in registration as a neutral position of the speed change gear shaft.

(2) When the speed change gear shaft is rocked to a rotational limit on the one side or the other side, the rotational angles of the speed change gear shaft are detected. It is then determined whether or not each of the detected rotational angles is within an allowable range on the one side or the other side. If the rotational angles are within the respective allowable ranges, the rotational angles are updated in registration as maximum angles and the allowable range is reduced. However, if any of the rotational angles is outside the allowable range, the allowable range is expanded. A middle point between the maximum angles on the one side and the other side is then updated in registration as a neutral position of the speed change gear shaft.

According to the countermeasure (1) described above, however, if the speed change gear shaft is rocked to the rotational limit on the one side or the other side, a neutral position of the speed change gear shaft is determined based on the rotational angles of the speed change gear shaft. Accordingly, an accurate neutral position can be always determined.

According to the countermeasure (2) described above, since the allowable range is narrowed as detection of the neutral position of the speed change gear shaft proceeds, even if a wrong rotational angle is input as a result of the influence of noise, etc., it can be removed. Furthermore, since the allowable range is gradually widened each time a rotational angle which exceeds the allowable range is detected, even when a rotational angle which exceeds the allowable range is a real rotational angle, the rotational angle is prevented from being repetitively eliminated.

Further scope of applicability of the present invention will become apparent from the detailed description given hereinafter However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
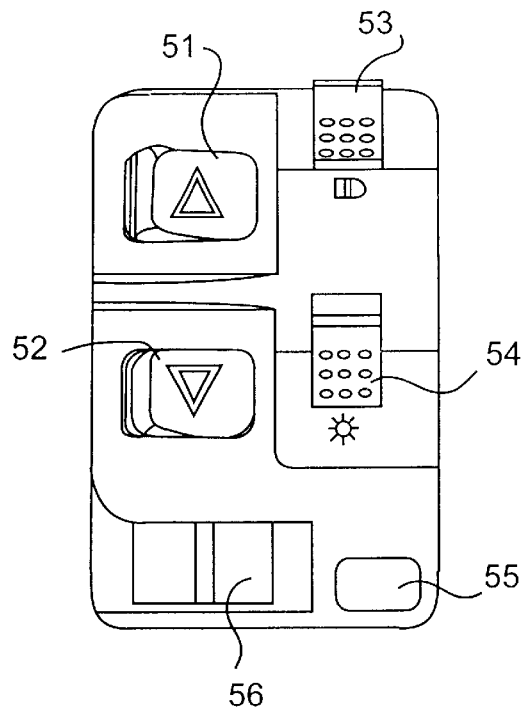
FIG. 1 is a plan view of an operation section of a vehicle on which an electrically operated speed change gear of the present invention is implemented.

In the following, the present invention is described in detail with reference to the drawings. FIG. 1 is a plan view of an operation section of a vehicle on which an electrically operated speed change gear of the present invention is implemented.

The operation section includes a shift-up switch 51 and a shift-down switch 52 for electrically operated speed change, a dimmer switch 53 for changing over the direction of a headlamp, a lighting switch 54 for changing over light-on/light-off of the headlamp, and a start switch 55 and a stop switch 56 for an engine. In the present embodiment, the shift position is shifted one by one upwardly or downwardly each time the shift switch 51 or 52 is depressed into an on-state.

Figure 2:
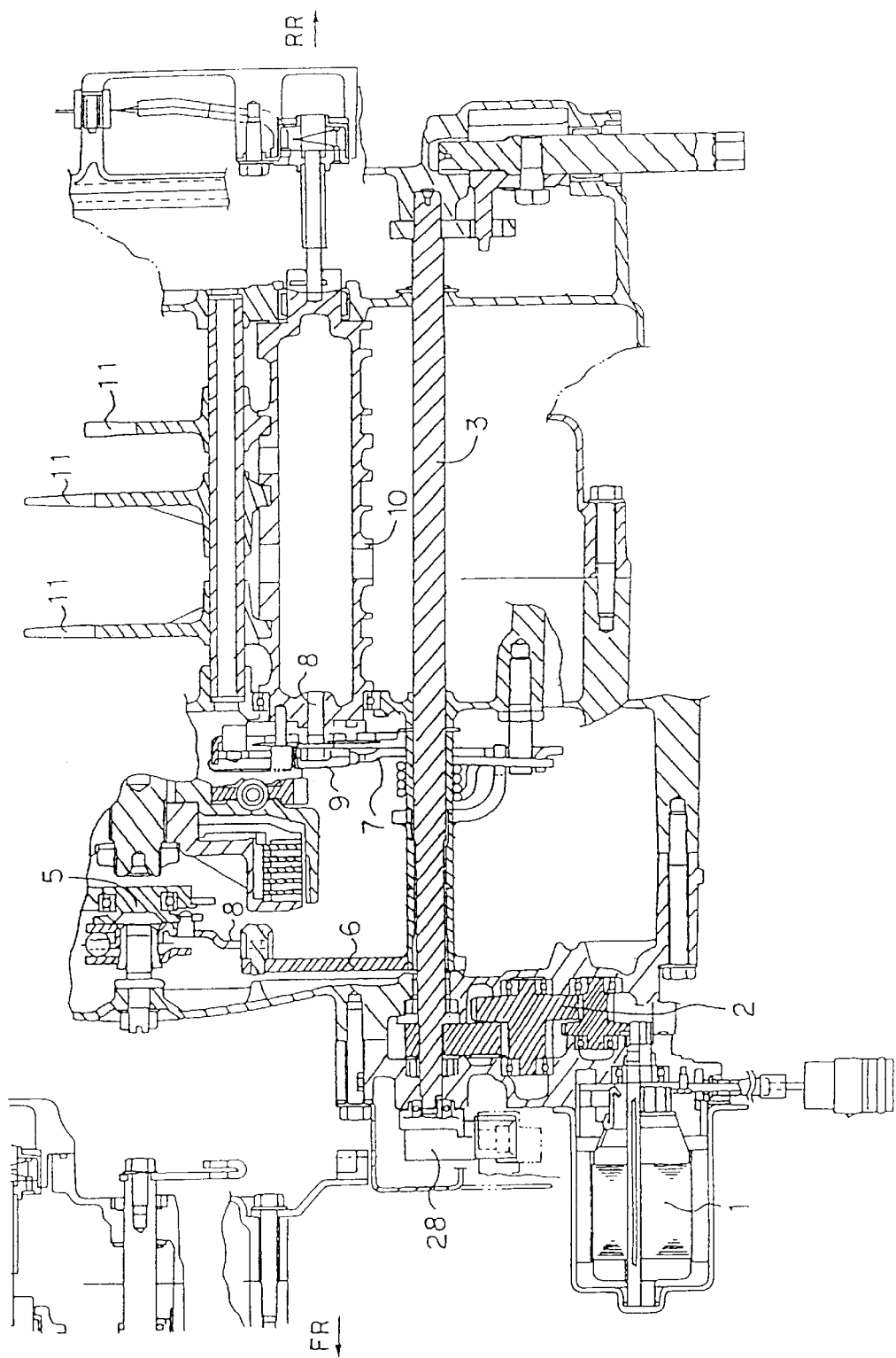
FIG. 2 is a partial sectional view showing a construction of a principal part of a drive system of the electrically operated speed change gear according to an embodiment of the present invention.

FIG. 2 is a partial sectional view showing a construction of a principal part of a drive system of the electrically operated speed change gear according to an embodiment of the present invention.

A drive motor 1 as an electric actuator rotates a shift spindle 3 in a forward or reverse direction through a deceleration gear mechanism 2. The rotational position (angle) of the shift spindle 3 (speed change gear shaft) is detected by an angle sensor 28 provided at one end of the shift spindle 3. A conversion mechanism 8 for converting a rotational movement of the shift spindle 3 into a linear movement is provided at one end of a clutch arm 6 which extends vertically from the shift spindle 3. The conversion mechanism 8 cancels, when the shift spindle 3 is rotated from its neutral position by the drive motor 1, connection of the speed change clutch 5 in the process of rotation of the shift spindle 3 independently of the direction of rotation of the shift spindle 3, and restores the connection condition in the process wherein the shift spindle 3 is reversely rotated back to the neutral position. The clutch arm 6 and the conversion mechanism 8 are constructed such that connection of the speed change clutch 5 is cancelled when the shift spindle 3 is rotated over a predetermined angle (for example, ±6 degrees).

One end of a master arm 7 secured to the shift spindle 3 engages a clutch mechanism 9 provided on a shift drum shaft 8, so that, when the shift spindle 3 is rotated by the drive motor 1, the master arm 7 rotates a shift drum 10 in a direction corresponding to the direction of rotation of the shift spindle 3. When the shift spindle 3 is rotated in either direction from its neutral position, the master arm 7 and the clutch mechanism 9 are engaged with the shift spindle 3 to form a clutch mechanism such that the shift spindle 3 rotates the shift drum 10. However, when the shift spindle 3 is rotated in a direction to return to the neutral position, the engagement of the shift spindle 3 is canceled to leave the shift drum 10 at the present position.

Ends of shift forks 11 engage with outer circumferential grooves 31 of respective sleeves 30 which will be hereinafter described with reference to FIG. 4, so that, if a shift fork 11 is moved in parallel in an axial direction in response to rotation of the shift drum 10, then one of the sleeves is moved in parallel on a main shaft (not shown) in response to the direction of rotation and the rotational angle of the shift drum 10.

Figure 4:
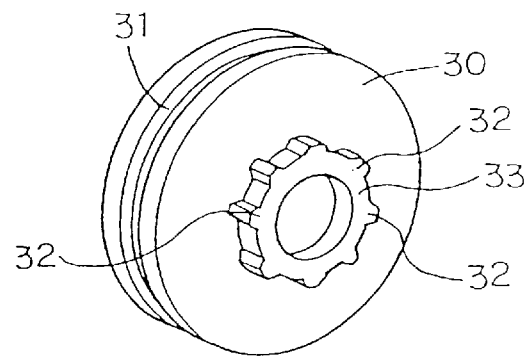
FIG. 4 is a perspective view of the sleeve of the present invention.

FIG. 4 is a perspective view of a sleeve 30 described above. The sleeve 30 is fitted on the main shaft (not shown) for sliding movement in an axial direction. A groove 31 which is engaged with an end of a shift fork 11 described above is formed along a circumferential direction on an outer peripheral side face of the sleeve 30. A plurality of convex dowels 32 for engaging with concave dowels 42 of a gear 40 which will be hereinafter described with reference to FIG. 5 are formed integrally together with an annular flange 33 around an outer periphery of a shaft hole of the sleeve 30.

Figure 3:
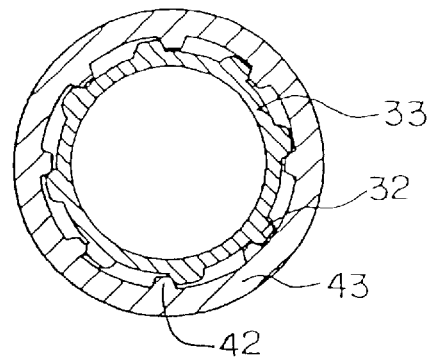
FIG. 3 is a view of a condition wherein a sleeve and a gear are engaged with each other.
Figure 5:
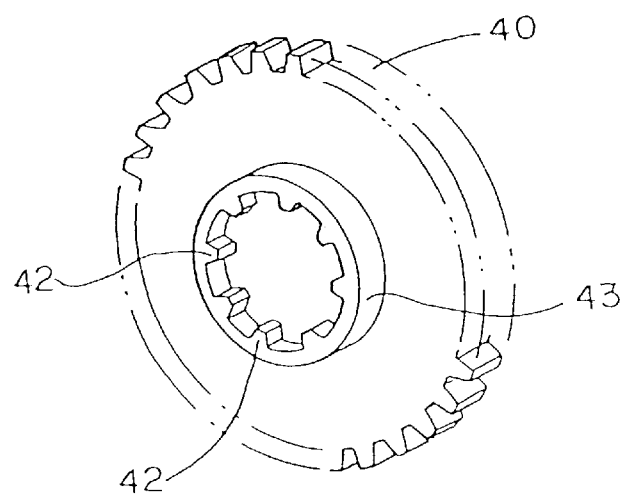
FIG. 5 is a perspective view of the gear of the present invention.
Figure 9:
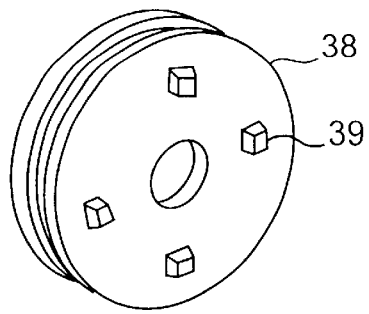
FIG. 9 is a perspective view of a conventional sleeve.
Figure 10:
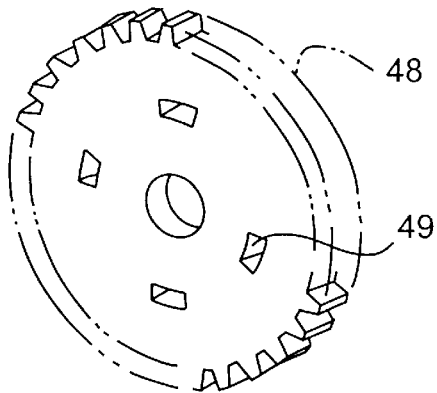
FIG. 10 is a perspective view of a conventional gear.

FIG. 5 is a perspective view of the gear 40 described above. The gear 40 is supported for rotation at a predetermined position on the main shaft (not shown). A plurality of concave dowels 42 for engaging with the convex dowels 32 of the sleeve 30 described above are formed integrally with an annular flange 43 on an outer periphery of a shaft hole of the gear 40. FIG. 3 is a schematic view showing the sleeve 30 and the gear 40 when they are engaged with each other through the dowels 32 and 42 thereof FIGS. 9 and 10 are perspective views of a conventional sleeve 38 and a conventional gear 48, respectively. The sleeve 38 has a plurality of convex dowels 39 provided independently of each other coaxially with a shaft hole of the gear.

However, if the convex dowels 39 are attempted to be made independently of each other, then in order to assure a sufficient strength, the bottom areas of the convex dowels 39 must be comparatively large.

Therefore, according to the conventional art the ratio of the widths of the convex dowels 39 and dowel holes 49 of the gear 40 in the direction of rotation is comparatively high. Approximately four convex dowels 39 are therefore provided as shown in the figure.

Figure 12:
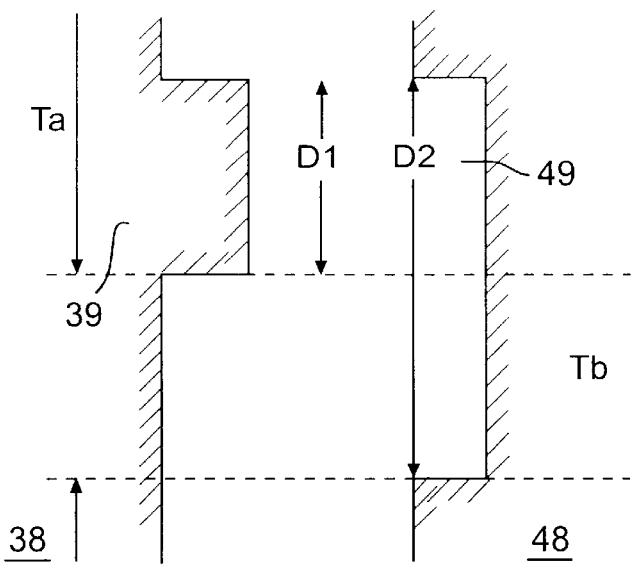
FIG. 12 is a view schematically showing an engagement timing of the conventional sleeve and gear.

FIG. 12 is a view which schematically represents a conventional relative positional relationship between a convex dowel 39 of the sleeve 38 and a dowel hole 49 of the gear 48. The width D2 of the dowel hole 49 in the direction of rotation is approximately twice as much as the width D1 of the convex dowel 39. Therefore, a period Ta within which the convex dowel 39 cannot be engaged with (dowel-in) the dowel hole 49 is longer than another period Tb in which the dowel 39 can be engaged with (dowel-in) the dowel hole 49.

In contrast, in the present embodiment, since the convex dowels 32 are formed integrally with the annular flange 33, the width D3 of each convex dowel 32 and the width D4 of each concave dowel 42 of the gear 40 can be made sufficiently short while maintaining a sufficient strength. Consequently, the period Ta within which a convex dowel 32 cannot be engaged with a dowel hole 46 can be made short compared with the period Tb in which dowel-in is possible. The possibility of enabling dowel-in can therefore be increased.

Furthermore, in the present embodiment, since the difference between the width D5 of the dowel hole 46 in the direction of rotation and the width D3 of the convex dowel 32 can be made small, play caused after engaging them with each other can be reduced, and reduction of speed change shock and speed change noise can be achieved.

Figure 6:
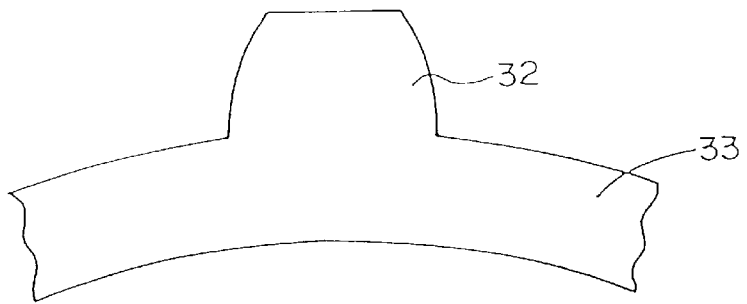
FIG. 6 is a partial enlarged view of a convex dowel 32 of the sleeve.
Figure 7:
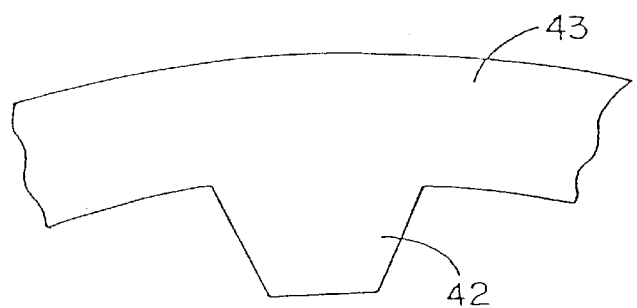
FIG. 7 is a partial enlarged view of a concave dowel 42 of the gear.
Figure 8:
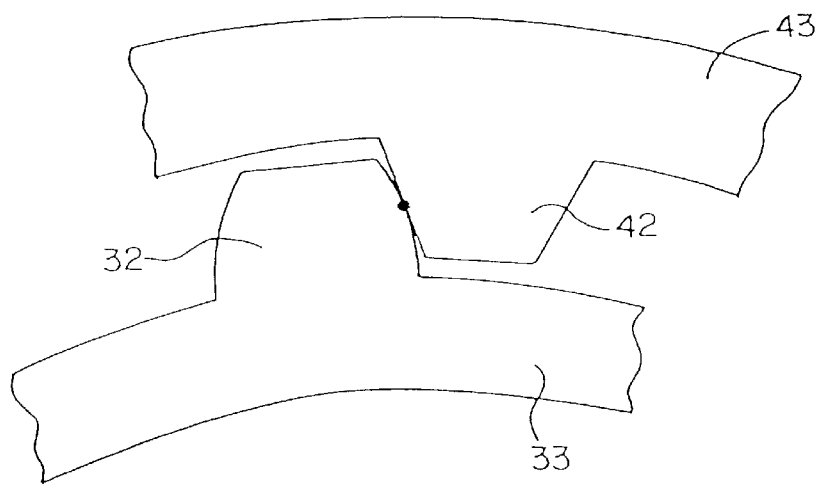
FIG. 8 is a view showing an engaged condition of the convex dowel 32 and the concave dowel 42.

Furthermore, in the present embodiment, while the taper of each convex dowel 32 is curved in a convex shape as shown in FIG. 6, the taper of each concave dowel 42 is formed straight as seen in FIG. 7. Therefore, the dowels 32 and 42 can contact with each other along a line in an axial direction as shown in FIG. 8. Consequently, concentration of stress can be prevented, and strength of the dowels can be increased substantially while achieving increase of durability and abrasion resistance.

In such a construction as described above, if one of the sleeves 30 is moved in parallel to a predetermined position by the corresponding shift fork 11 and the convex dowels 32 of the sleeve 30 are engaged with the dowel holes 46 of the gear 40, then the gear which has been supported in an idling state on the main shaft 4 is engaged with the main shaft 4 by the sleeve and is rotated in synchronism with the sleeve. As a result, rotating force transmitted from a clutch shaft to a countershaft (both not shown) is transmitted to the main shaft 4 through the gear.

It should be noted that, although not shown, the engine of the vehicle on which the electrically operated speed change gear of the present invention is implemented is a 4-cycle engine. Power of the engine is transmitted to a power transmission system from the crankshaft to the main shaft through a centrifugal clutch on the crankshaft and another clutch on the main shaft. Accordingly, when the engine speed is lower than a predetermined value, the centrifugal clutch cuts the transmission of power to the clutch on the main shaft. As a result, if the vehicle is in a stopping state, then the gear can be shifted to any gear position.

Figure 14:
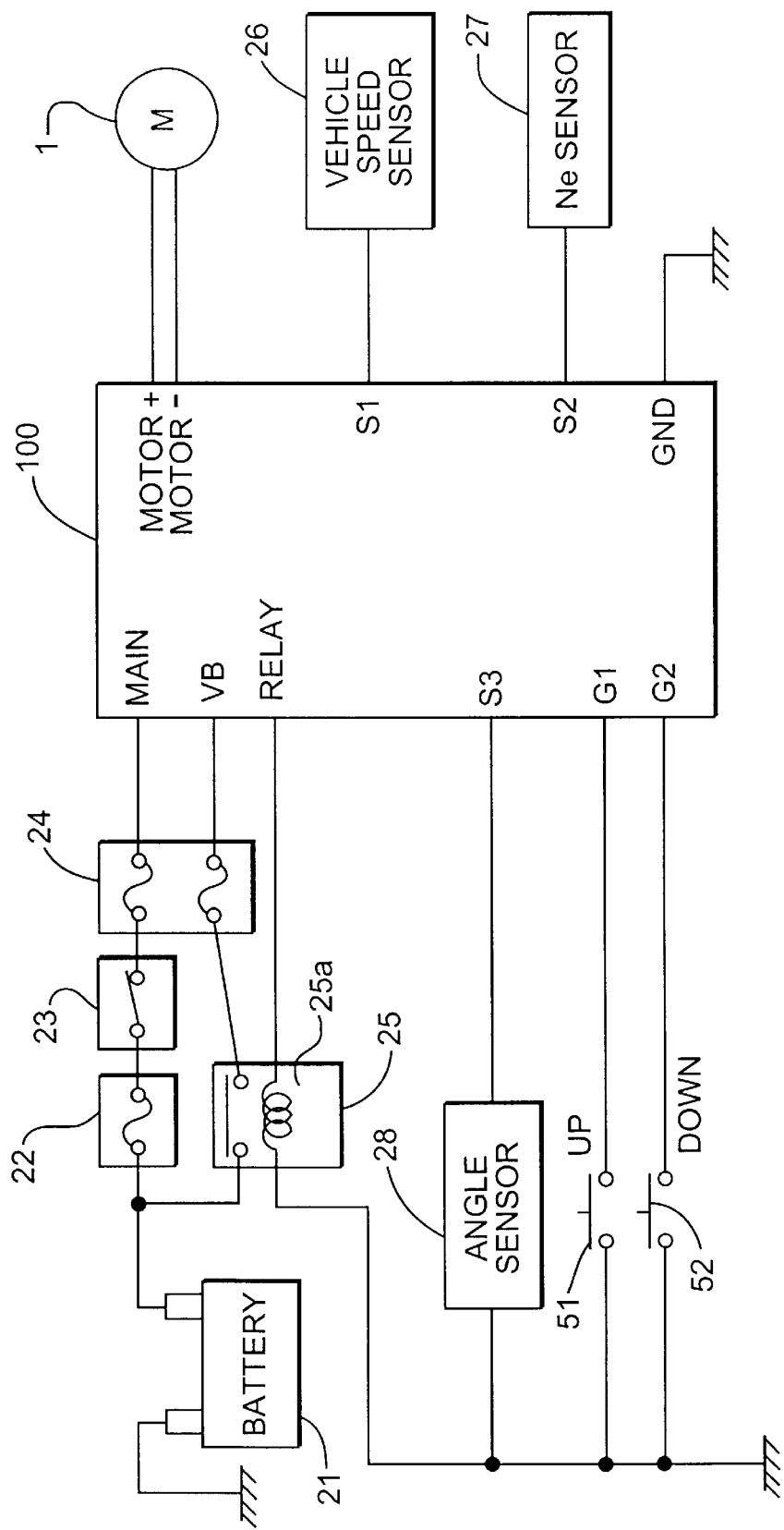
FIG. 14 is a block diagram showing a construction of principal part of a control system of the electrically operated speed change gear according to an embodiment of the present invention.
Figure 15:
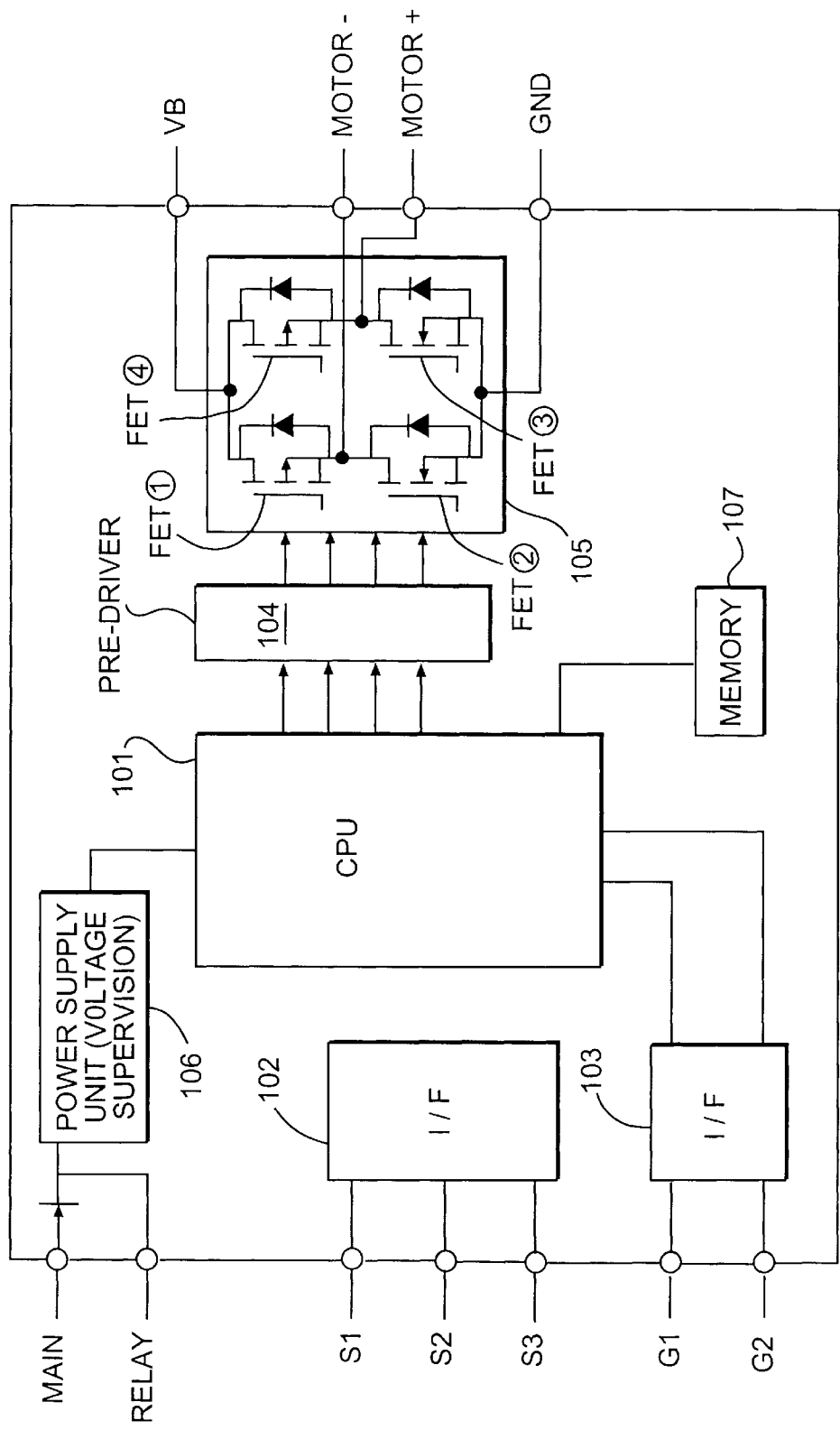
FIG. 15 is a block diagram showing an example of a construction of an ECU 100 shown in FIG. 14.

FIG. 14 is a block diagram showing a construction of a principal part of a control system of the electrically operated speed change gear according to an embodiment of the present invention. FIG. 15 is a block diagram showing an example of an ECU 100 shown in FIG. 14.

Referring to FIG. 14, the drive motor 1 is connected to a MOTOR (+) terminal and a MOTOR (−) terminal of the ECU 100. A vehicle speed sensor 26 for detecting the vehicle's speed, an Ne sensor 27 for detecting the engine speed, and an angle sensor 28 for detecting the rotational angle of the shift spindle 3 are connected to sensor signal terminals S1, S2 and S3, respectively. The shift-up switch 51 and the shift-down switch 52 are connected to speed change instruction terminals G1 and G2, respectively.

A battery 21 is connected to a MAIN terminal of the ECU 100 through a main fuse 22, a main switch 23 and a fuse box 24, and is connected also to a VB terminal through a failsafe (F/S) relay 25 and the fuse box 24. An exciting coil 25a of the failsafe (F/S) relay 25 is connected to a RELAY terminal.

In the ECU 100, the MAIN terminal and the RELAY terminal described above are connected to a power supply circuit 106 as shown in FIG. 15. The power supply circuit 106 is connected to a CPU 101. The sensor signal terminals S1, S2 and S3 are connected to input terminals of the CPU 101 through an interface circuit 102. The speed change instruction terminals G1 and G2 are connected to input terminals of the CPU 101 through another interface circuit 103.

A switching circuit 105 is composed of a parallel connection of a series connection of an FET ① and an FET ②, and another series connection of an FET ③ and an FET ④. A terminal of the parallel connection is connected to the VB terminal described hereinabove while the other terminal is connected to the GND terminal. A junction between the FET ① and the FET ② is connected to the MOTOR (−) terminal while a junction between the FET ③ and the FET ④ is connected to the MOTOR (+) terminal. The FET ① to the FET ④ are selectively PWM controlled through a pre-driver 104 by the CPU 101. The CPU 101 controls the FET ① to the FET ④ based on a control algorithm stored in a memory 107.

A speed change controlling method by the electrically operated speed change gear of the present invention will now be described with reference to the flowcharts of FIGS. 16 to 22 and an operation timing chart of FIG. 23.

In step S10, it is determined whether or not any of the shift switches are operated into an on-state. If it is determined that any of the shift switches are operated into an on-state, then it is determined in step S11 which one of the shift-up switch 51 and the shift-down switch 52 is operated into an on-state. If it is determined that the shift-up switch 51 is operated into an on-state, then the processing advances to step S13, but if it is determined that the shift-down switch 52 is operated into an on-state, then the engine speed Ne is stored as a variable Ne1 in step S12. The processing then advances to step S13.

Figure 23:
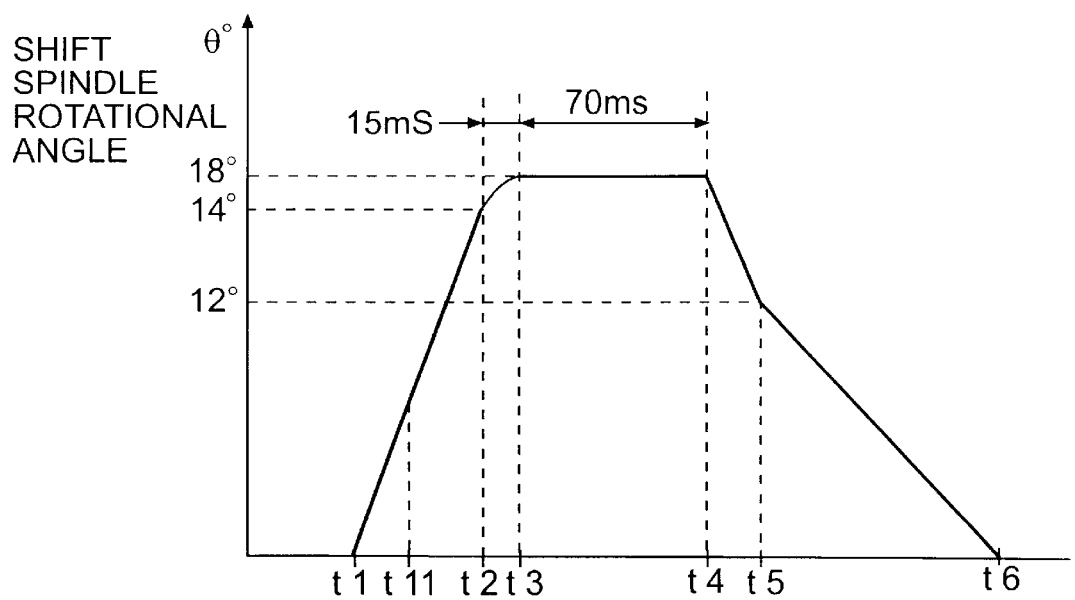
FIG. 23 is an operation timing chart of a shift spindle according to the present invention.

In step S13, the FETs which form the switching circuit 105 in the ECU 100 are selectively PWM controlled from time $t_1$ of FIG. 23 in response to the shift switch which has been operated into an on-state. In particular, if the shift-up switch 51 has been operated into an on-state, then the FET ④ is rendered conducting while the FETs ① and ③ are left non-conducting, and the FET ② is PWM controlled with a duty ratio of 100%. As a result, the drive motor 1 starts its rotation in the shift-up direction, and in association therewith, the shift spindle 3 also starts its rotation in the shift-up direction from its neutral position.

On the other hand, if the shift-down switch 52 has been operated into an on-state, then the FET ① is rendered conducting while the FETs ② and ④ are left nonconducting, and the FET ③ is PWM controlled with a duty ratio of 100%. As a result, the drive motor 1 starts its rotation in the shift-down direction, and in association therewith, also the shift spindle 3 starts its rotation in the shift-down direction from its neutral position.

Where the duty ratio of the PWM control is set to 100% in this manner, a high shifting speed can be obtained, and the clutch can be disconnected rapidly. It is to be noted that the present embodiment is designed such that, when the shift spindle 3 rotates by ±5 to 6 degrees from the neutral position, the clutch is disconnected.

In step S14, a first timer (not shown) starts its counting operation of time, and in step S15, the rotational angle $\theta_0$ of the shift spindle 3 is detected by the angle sensor 28. In step S16, it is determined whether or not the detected rotational angle $\theta_0$ exceeds a first reference angle $\theta_{REF}$ (in the present embodiment, ±14 degrees from the neutral position) (+14 degrees or more, or −14 degrees or less; hereinafter represented merely as ±xx degrees or more).

If it is determined that the rotational angle $\theta_0$ is ±14 degrees or more, then since the possibility that the sleeve which has been moved in parallel by a shift fork 11 may have reached its regular fitting (dowel-in) position is high, the processing advances to step S17. However, if the rotational angle $\theta_0$ is not ±14 degrees or more, since it can be determined that the sleeve has not reached its regular fitting position, the control advances to step S30 which will be hereinafter described.

If it is determined at time $t_2$ based on the rotational angle $\theta_0$ that a sleeve has been moved in parallel to its normal fitting position, then the first timer is reset in step S17. In step S18, the FETs of the switching circuit 105 are controlled in order to brake the drive motor 1 which is rotating. In particular, the FETs ① and ④ are rendered conducting while the FETs ② and ③ are left non-conducting.

As a result, since the drive motor 1 is short-circuited and now serves as a load to the rotation, a braking action acts upon the driving torque in the shift-up direction or the shift-down direction of the shift spindle 3. Therefore, shock when the shift spindle 3 is brought into abutment with a stopper can be moderated. This is advantageous also in regard to strength and noise. It is to be noted that the rotational angle of the shift spindle 3 when it abuts with the stopper is ±18 degrees from the neutral position.

Figure 17:
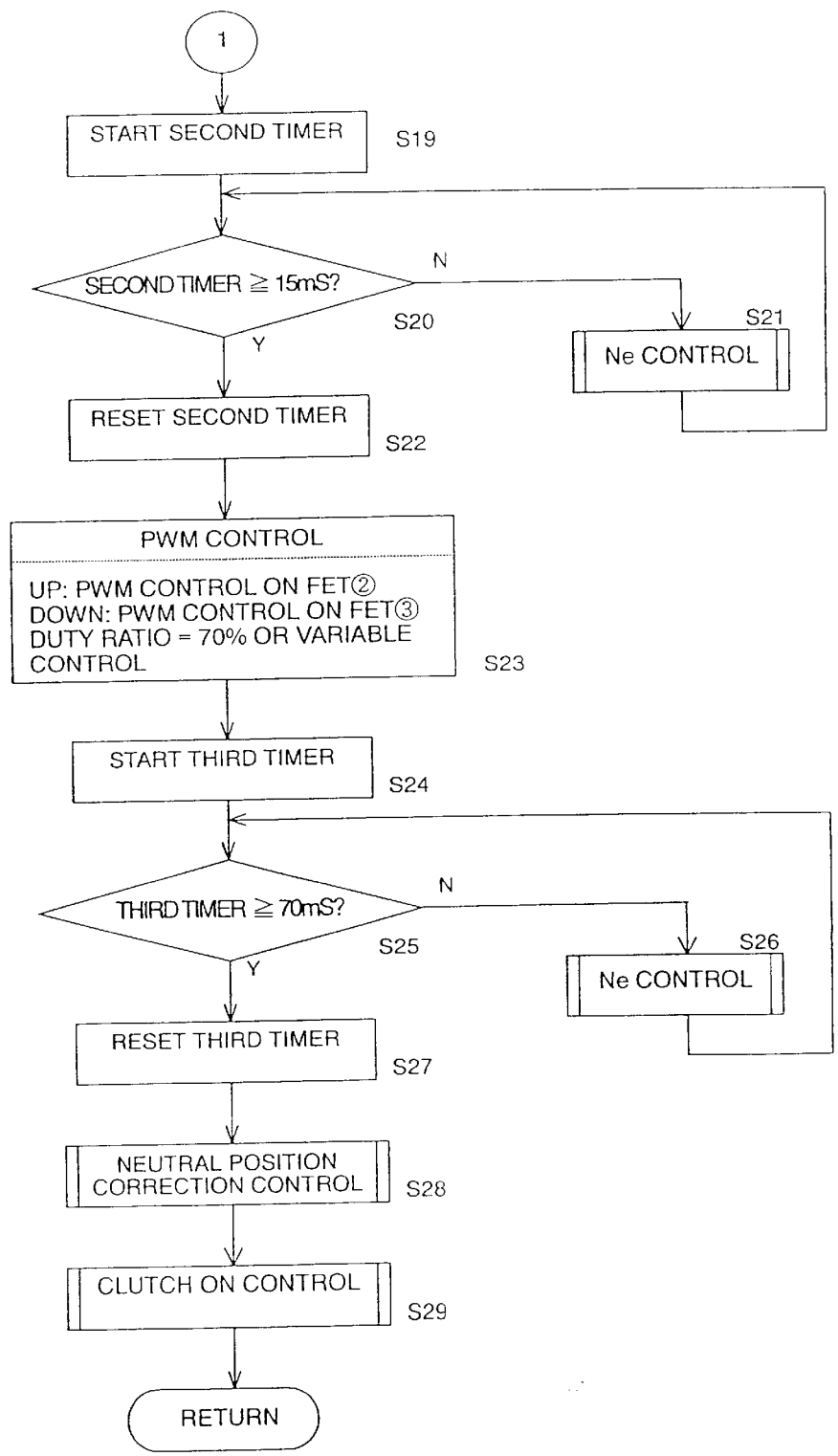
FIG. 17 is a flowchart (part 2) of an embodiment of the present invention.

In step S19 of FIG. 17, a second timer for defining a braking time starts time counting, and in step S20, it is determined whether or not the counted time of the second timer exceeds 15 ms. Before the counted time of the second timer exceeds 15 ms, the control advances to step S21, in which engine speed (Ne) control which will be hereinafter described in detail is executed. Thereafter, when the counted time exceeds 15 ms at time $t_3$, the processing advances to step S22, in which the second timer is reset.

In step S23, the FETs of the switching circuit 105 are selectively PWM controlled in response to the shift switch which has been operated into an on-state. In particular, during a shift-up operation, the FET ④ is rendered conducting while the FETs ① and ③ are left non-conducting, and the FET ② is PWM controlled with a duty ratio of 70%. On the other hand, during a shift-down operation, the FET ① is rendered conducting while the FETs ② and ④ are left non-conducting, and the FET ③ is PWM controlled with a duty ratio of 70%. As a result, since a sleeve 30 is pressed towards the gear 40 with a comparatively low torque, the loads applied to the dowels before completing dowel-in are moderated and the dowel-in states can be maintained with certainty.

In step S24, a third timer starts time counting, and in step S25, it is determined whether or not the counted time of the third timer exceeds 70 ms. If the counted time does not exceed 70 ms, then the control advances to step S26, in which the Ne control is executed. On the other hand, if the counted time exceeds 70 ms, then the third timer is reset in step S27, and neutral position correction control for determining a neutral position (angle) $\theta_N$ of the shift spindle 3 is executed in step S28. In step S29, clutch ON control which will be hereinafter described is started at time $t_4$.

Figure 13:
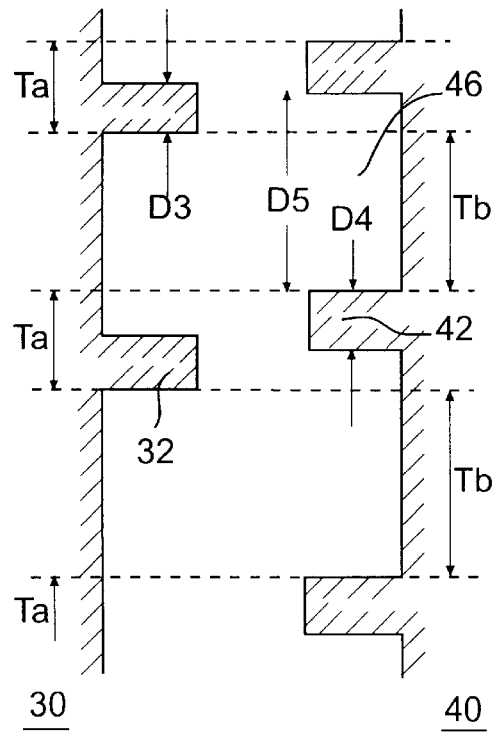
FIG. 13 is a view schematically showing an engagement timing of the sleeve and the gear of the present invention.

It is to be noted that the time-up time of the third timer in the present embodiment is determined based on the period Ta within which dowel-in cannot be performed described hereinabove with reference to FIG. 13. In particular, the time-up time (70 ms) is set so that pressing control may be performed at least until the period Ta elapses. During this period, the convex dowels 32 of the sleeve 30 and the concave dowels 42 of the gear 40 contact with each other. However, since the duty ratio is reduced down to 70%, the load applied to each dowel is low, thus making it advantageous in terms of the strength.

Furthermore, the time-up time of the third timer is not limited to a fixed value, but may be set variably as a function of the gear such that, for example, if the gear is in a range of the first to third gear positions, time-up of the third timer occurs at 70 ms, but if the gear is in another range of the fourth to fifth gear positions, then time-up of the third timer occurs at 90 ms.

Furthermore, while, in the embodiment described above, it is described that the duty ratio upon PWM control is fixed and the sleeves 30 are pressed towards the gear 40 with a fixed torque, the duty ratio upon the PWM control may be controlled variably.

Figure 24:
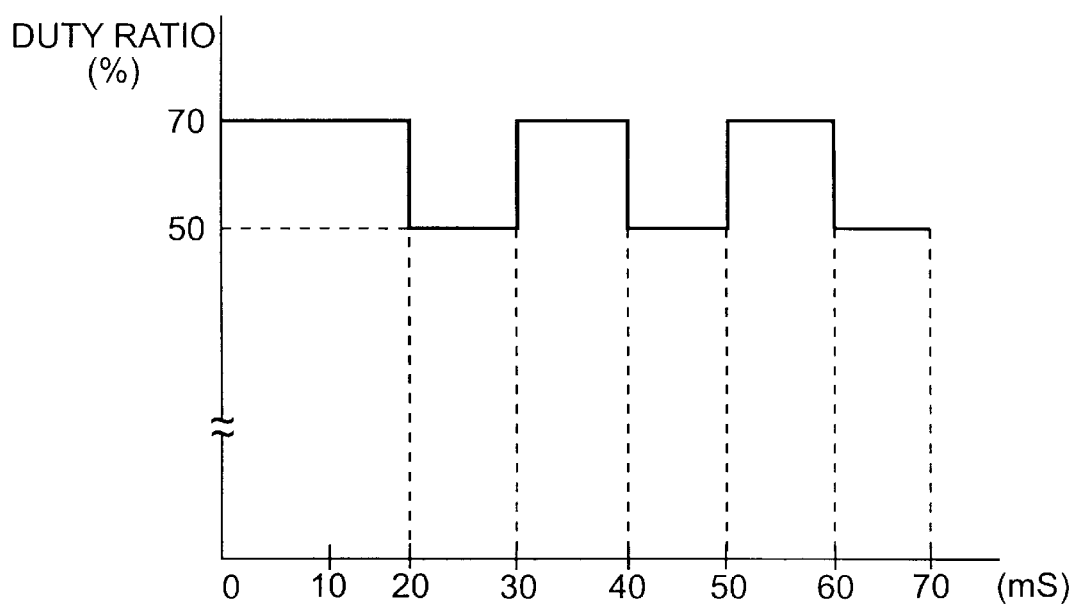
FIG. 24 is a view showing a variable controlling method for the duty ratio in pressing control.

FIG. 24 is a view illustrating a variable controlling method of the duty ratio of the PWM control executed in step S23 described hereinabove, and in the present embodiment, PWM control is performed with a duty ratio of 70% for the first period of 20 ms, but thereafter, PWM is controlled with another duty ratio of 50% and the duty ratio of 70% are repeated alternately after each 10 ms.

If the sleeve 30 is pressed towards the gear 40 with a varied torque, by increasing or decreasing the force when pressing, in this manner, even if the convex dowels 32 and the concave dowels 42 contact with each other and cannot be fitted with each other when the sleeve 30 is pressed towards the gear 40 with a torque corresponding to the duty ratio of 70%, the pressing torque is reduced promptly to a torque corresponding to the duty ratio of 50%. Consequently, the load applied to each dowel is decreased and relative rotation between them is facilitated. Therefore, sufficient dowel-in can be performed.

Figure 16:
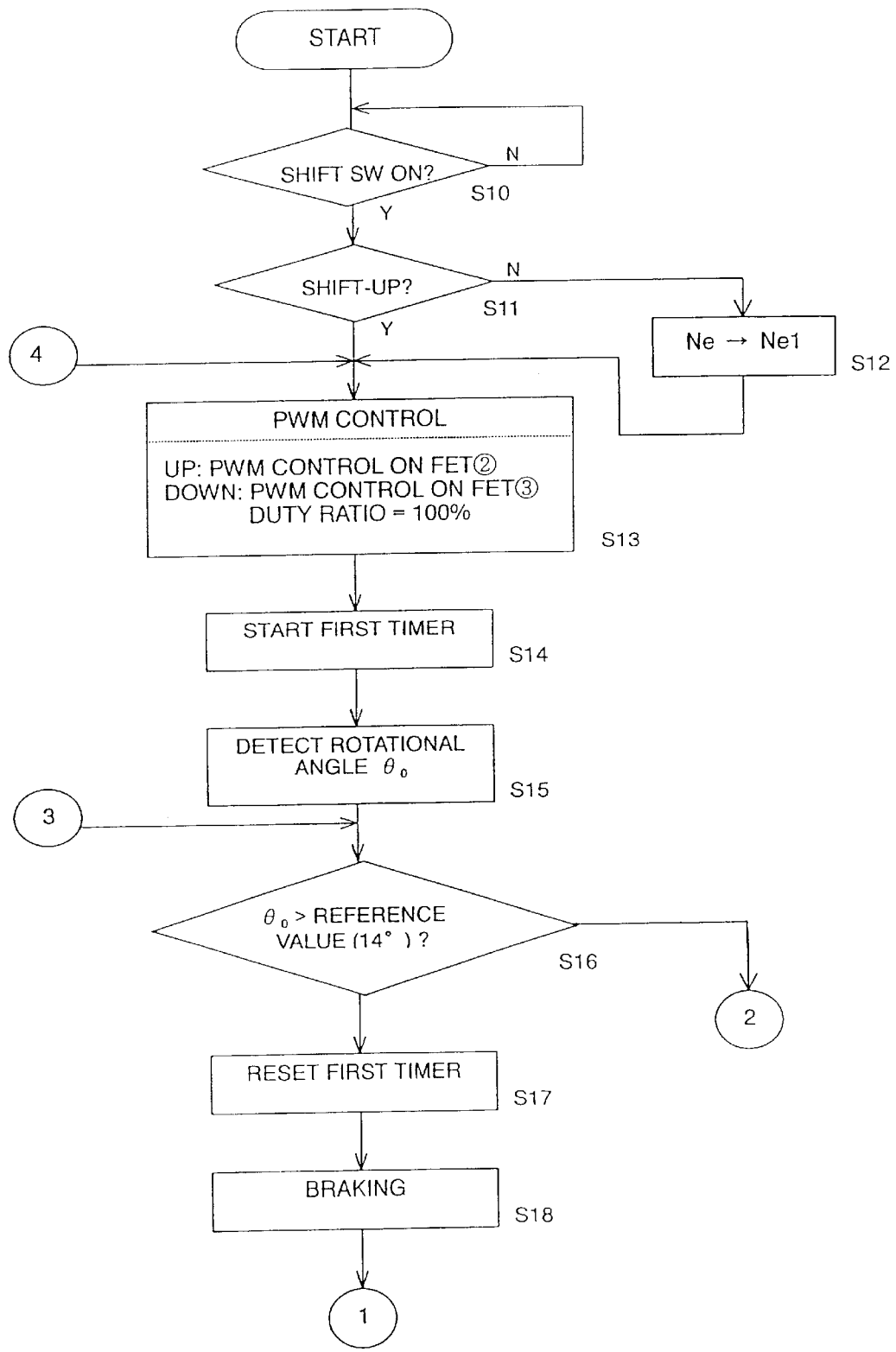
FIG. 16 is a flowchart (part 1) of an embodiment of the present invention.
Figure 18:
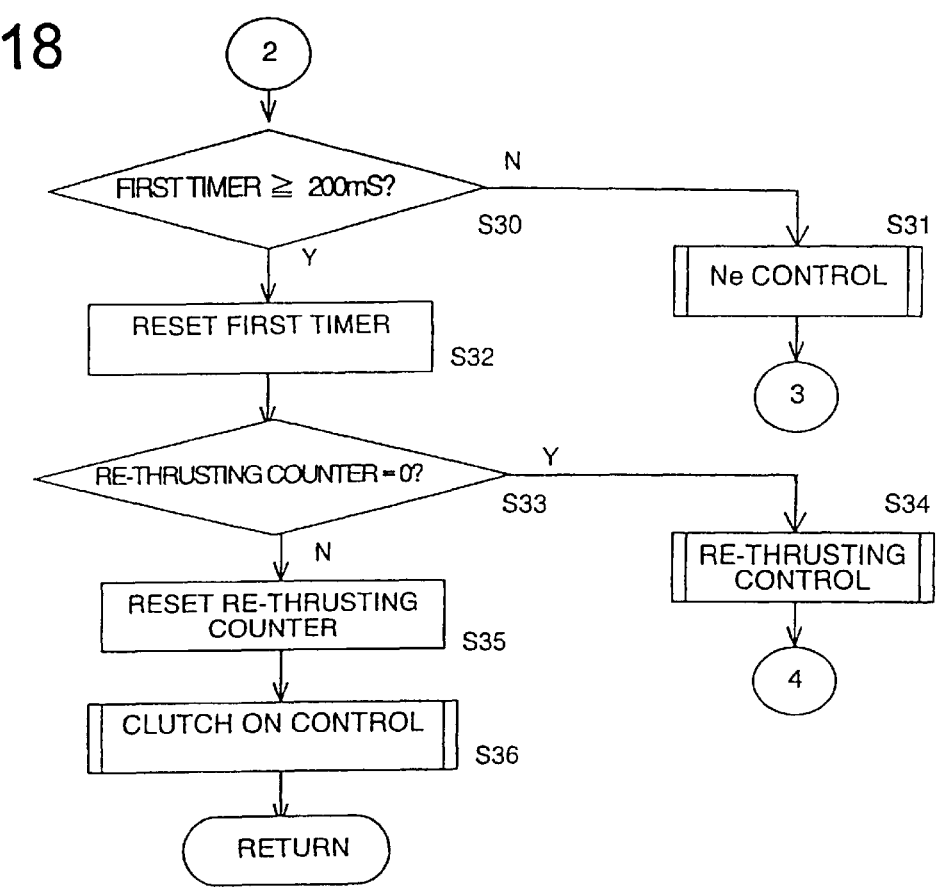
FIG. 18 is a flowchart (part 3) of an embodiment of the present invention.

On the other hand, if it is determined in step S16 of FIG. 16 described hereinabove that the rotational angle $\theta_0$ is lower than the first reference value, then the processing advances to step S30 of FIG. 18. In step S30, it is determined whether or not the counted time by the first timer described hereinabove exceeds 200 ms. Since it is determined that the counted time does not exceed 200 ms at first, the Ne control is executed in step S31. The processing then returns to step S16 of FIG. 16.

If it is thereafter determined that the counted time of the first timer exceeds 200 ms and the shift change operation in the present cycle fails, then the first timer is reset in step S32. In step S33, the counted value of a re-thrusting counter which will be hereinafter described is referred to. If the counted value of the re-thrusting counter indicates a reset state (=0), it is determined that re-thrusting control has not been executed. Thus, the processing advances to step S34, in which the re-thrusting control which will be hereinafter described is executed for the first time. This is because, if a shift change operation requires a lot of time, the driver may experience an unfamiliar driving experience.

On the other hand, if the re-thrusting counter indicates a set state (=1), then it is determined that the shift change operation has not been performed successfully although the re-thrusting control has been executed, and the processing advances to step S35 in order to connect the clutch without performing a shift change operation. In step S35, the re-thrusting counter is reset, and in step S36, the clutch ON control which will be hereinafter described is executed.

Figure 19:
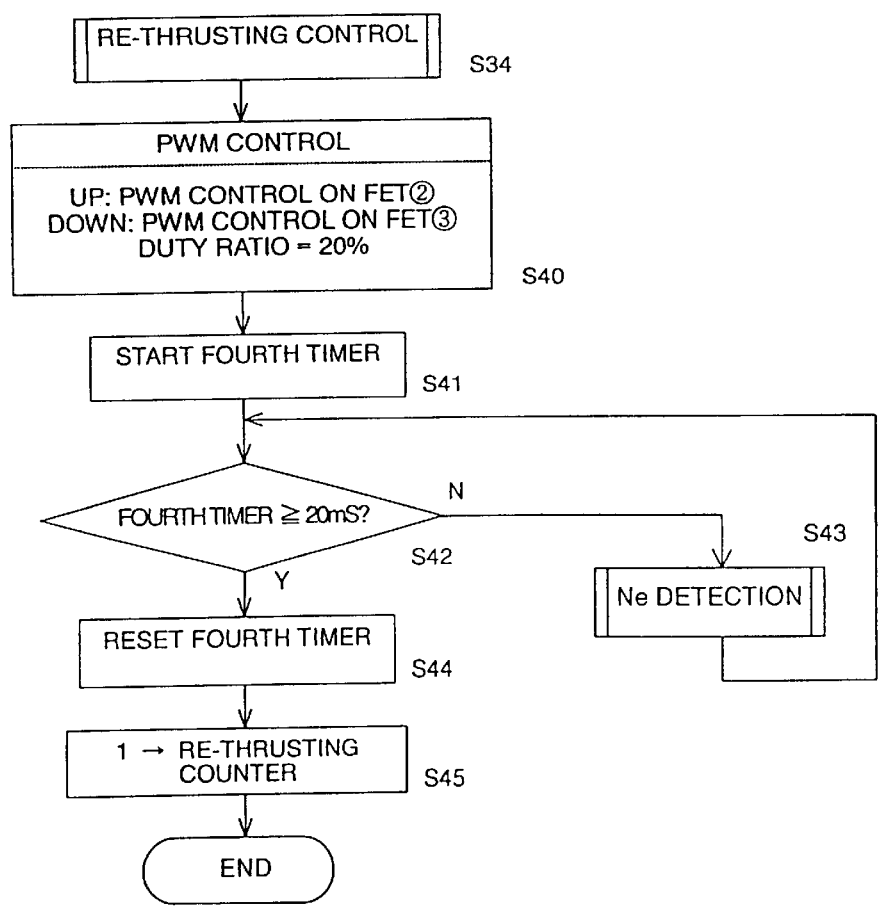
FIG. 19 is a flowchart (part 4) of an embodiment of the present invention.

A controlling method of the re-thrusting control will now be described with reference to the flowchart of FIG. 19. The re-thrusting control is a process of decreasing the moving torque temporarily and then applying a predetermined torque again to attempt to perform re-movement (thrusting) of the sleeve 30 when a sleeve 30 which is moved in parallel in an axial direction by a shift fork cannot be moved to its regular fitting position.

In step S40, the duty ratio of the FET which is under SWM control, that is, if a shift-up operation is proceeding, the duty ratio of the FET ② is decreased to 20%, but during a shift-down operation, the duty ratio of the FET ③ is decreased to 20%. As a result, the driving torque applied to the sleeve 30 from the shift fork 11 is moderated.

In step S41, a fourth timer starts time counting, and in step S42, it is determined whether or not the counted time of the fourth timer exceeds 20 ms. If the counted time does not exceed 20 ms, then the processing advances to step S43, in which the Ne control is executed.

On the other hand, if the counted time exceeds 20 ms, then the fourth timer is reset in step S44, and the re-thrusting counter is set in step S45. Thereafter, the processing returns to step S13 of FIG. 16 described hereinabove, so that the drive motor 1 is PWM controlled with the duty ratio of 100% again. Consequently, the initial high torque is applied to the sleeve.

In the present embodiment, if a shift change operation is not performed regularly as described above, the pressing torque upon the sleeve is moderated temporarily and then the sleeve is pressed with a high torque again, thus re-thrusting of the sleeve is performed readily.

Figure 20:
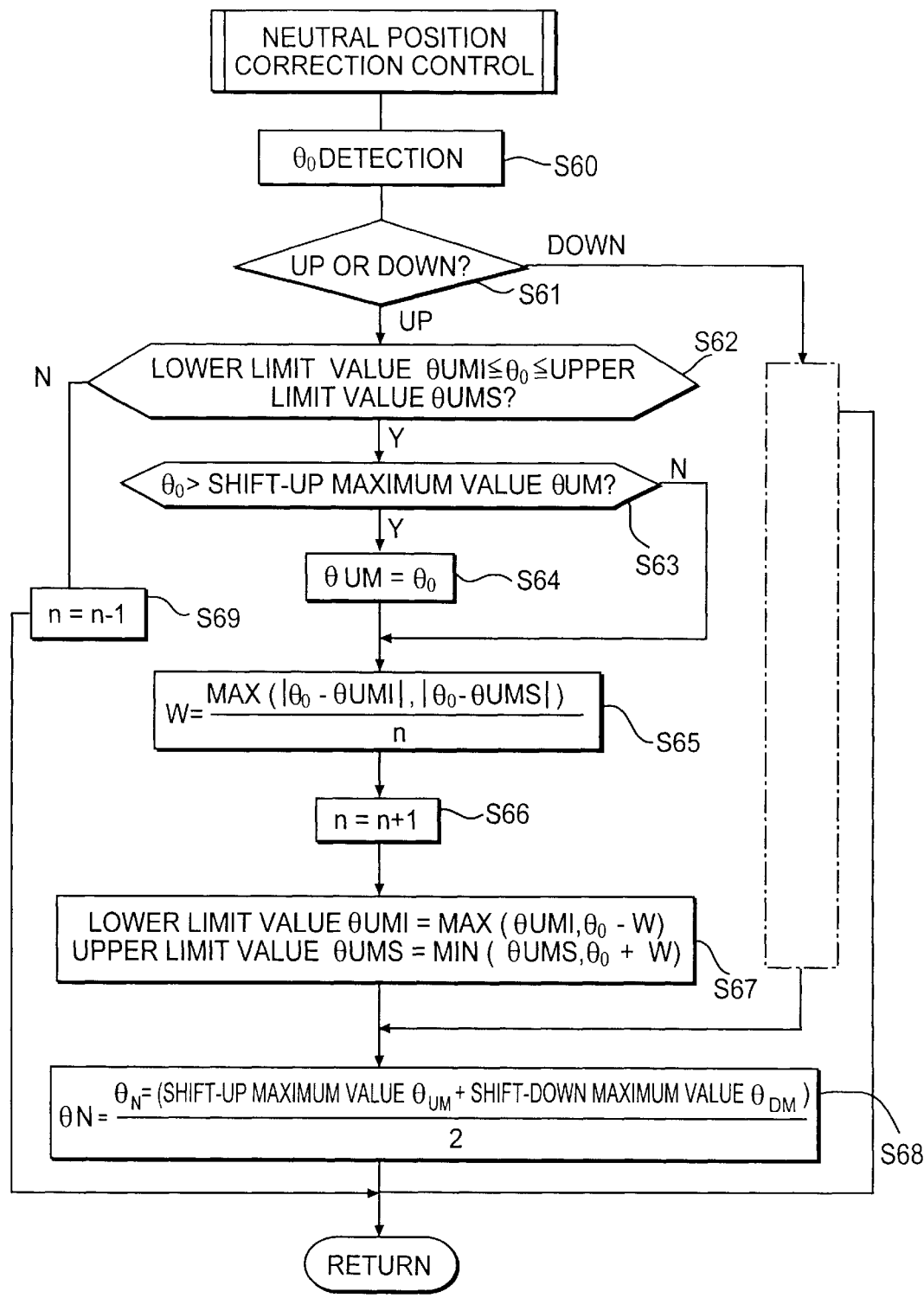
FIG. 20 is a flowchart (part 5) of an embodiment of the present invention.

Operation of the neutral position correction control executed in step S28 described hereinabove will now be described with reference to the flowchart of FIG. 20.

In step S60, the present rotational angle $\theta_0$ of the shift spindle 3 is detected by the angle sensor 28. In step S61, it is determined which one of a shift-up operation or a shift-down operation is proceeding. If a shift-up operation is proceeding, the processing advances to step S62.

In step S62, in order to determinate whether or not the detected rotational angle $\theta_0$ is a regular value without including noise components, it is determined whether or not the detected rotational angle $\theta_0$ is within an allowable angle range between an allowable angle lower limit value $\theta_{UMI}$ and an allowable angle upper limit value $\theta_{UMS}$ registered in advance. Since the initial values of the lower limit value $\theta_{UMI}$ and the upper limit value $\theta_{UMS}$ of the allowable angle range are set so as to define a comparatively wide range, it is determined that the detected rotational angle $\theta_0$ is within the allowable angle range at first, and the processing advances to step S63.

In step S63, the detected rotational angle $\theta_0$ is compared with a maximum rotational angle (shift-up maximum angle) $\theta_{UM}$ for shifting up registered in advance. Since the initial value of the shift-up maximum angle $\theta_{UM}$ is set to a value is equal to the allowable angle lower limit value $\theta_{UMI}$ in advance, it is determined here that the rotational angle $\theta_0$ is greater than the shift-up maximum angle $\theta_{UM}$' and the processing advances to step S64.

In step S64, the shift-up maximum angle $\theta_{UM}$ is updated in registration to the rotational angle $\theta_0$. In step S65, a correction value W for narrowing the allowable angle range defined by the lower limit value $\theta_{UMI}$ and the upper limit value $\theta_{UMS}$ described above is calculated in accordance with the following expression (1).

$$W = \max([\theta_0 - \text{lower limit value } \theta_{UMI}],\ [\theta_0 - \text{upper limit value } \theta_{UMS}])/n \quad (1)$$

Here, [a] signifies a function for determining an absolute value of the value a, and max(a, b) signifies a function for selecting a larger one of the values a and b. Furthermore, the initial value of the variable n is set to "2" in advance.

In step S66, the variable n is incremented by 1. In step S67, the lower limit value $\theta_{UMI}$ and the upper limit value $\theta_{UMS}$ are updated in registration in accordance with the following expressions (2) and (3), respectively.

$$\text{Lower limit value } \theta_{UMI} = \max(\text{lower limit value } \theta_{UMI}, \theta_0 - W) \quad (2)$$

$$\text{Upper limit value } \theta_{UMS} = \min(\text{upper limit value } \theta_{UMS}, \theta_0 + W) \quad (3)$$

Here, min(a, b) signifies a function for selecting a smaller one from the values a and b. According to the expressions (1) to (3) given above, as far as the detected rotational angle $\theta_0$ remains within the allowable angle range defined by the lower limit value $\theta_{UMI}$ and the upper limit value $\theta_{UMI}$ the allowable angle range gradually narrows. Accordingly, the rotational angle $\theta_0$ including noise components can be removed with certainty in step S62 described above.

It is to be noted that, in the present embodiment, when such a rotational angle $\theta_0$ that is out of the allowable angle range is detected, the processing advances from step S62 to step S69, in which the variable n mentioned above is decremented by "1". As a result, the correction value W determined in step S65 becomes large, widening the allowable angle range a little. Accordingly, if a rotational angle $\theta_0$ which exceeds the allowable angle range is successively detected, then the rotational angle $\theta_0$ falls into the allowable angle range later, and it is updated in registration as the shift-up maximum angle $\theta_{UM}$ in step S64.

In step S68, the shift-up maximum angle $\theta_{UM}$ determined in step S64 described hereinabove and a maximum rotational angle (shift-down maximum angle) $\theta D_M$ for shifting down determined in step S61 in a similar manner as described above are substituted into the following expression (4) to determine the neutral angle $\theta_N$.

$$\theta_N = (\text{shift-up maximum angle } \theta_{UM} + \text{shift-down maximum angle } \theta_{DM})/2 \quad (4)$$

After the neutral angle $\theta_N$ is determined in such a manner as described above and updated in registration, the later rotational angle control of the shift spindle 3 is executed based on the neutral angle $\theta_N$ given above.

In this manner, according to the present embodiment, since the neutral angle $\theta_N$ is detected based on an actual range of rotation of the shift spindle 3, an accurate neutral position is always obtained without being influenced by an assembly error or a secular deterioration.

Furthermore, according to the present embodiment, since the detected value of the rotational angle $\theta_0$ is ignored as correction of the neutral position proceeds, even if the detected value gets out of order inadvertently due to a disturbance from outside, an accurate neutral position can be obtained irrespective of whether or not there is a disturbance from outside.

Furthermore, since the allowable angle range is gradually widened each time a rotational angle which exceeds the allowable range is detected, even if a value higher than ever is detected as a rotational angle as a result of, for example, deterioration of the angle sensor, such values are prevented from being successively ignored as wrong rotational angles.

Purposes and general operations of the various controls will now be described with reference to FIGS. 25 and 26 before operations of the Ne control and the clutch ON control described above are described in detail.

As shown in FIG. 23, in the present embodiment, if rotation of the shift spindle 3 is started at time $t_1$, then the connection of the clutch is cancelled at time $t_{11}$, and the rotation of the shift spindle is completed at time $t_3$. Thereafter, the pressing control is kept executed till time $t_4$, and then connection control of the clutch is entered.

In order to moderate speed change shock, the clutch is connected at a low speed. In other words, it is required to make the speed of rotation of the shift spindle 3 slower. On the other hand, since the speed of speed change relies upon the speed of rotation of the shift spindle 3, in order to realize a rapid speed change, it is required to raise the speed of rotation of the shift spindle 3.

Therefore, in the present invention, in order to simultaneously satisfy these two requirements described above, as seen in FIG. 23, the shift spindle 3 is rotated at a high speed until almost an angular range in which the clutch is connected from time $t_4$ to time $t_5$, but the shift spindle 3 is rotated at a low speed in another angular range later than time $t_5$ from which the clutch enters a connection condition. By such two stage return control, in the present embodiment, reduction of speed change shock and reduction of speed change time are achieved consistently.

Furthermore, in the present embodiment, the connection timing of the clutch is controlled to an optimum timing in response to an acceleration operation of each driver. FIGS. 25 and 26 are views illustrating manners wherein the shift spindle position $\theta_0$ and the engine speed Ne vary by the clutch ON control and the Ne control executed upon shifting up and shifting down, respectively.

Figure 25:
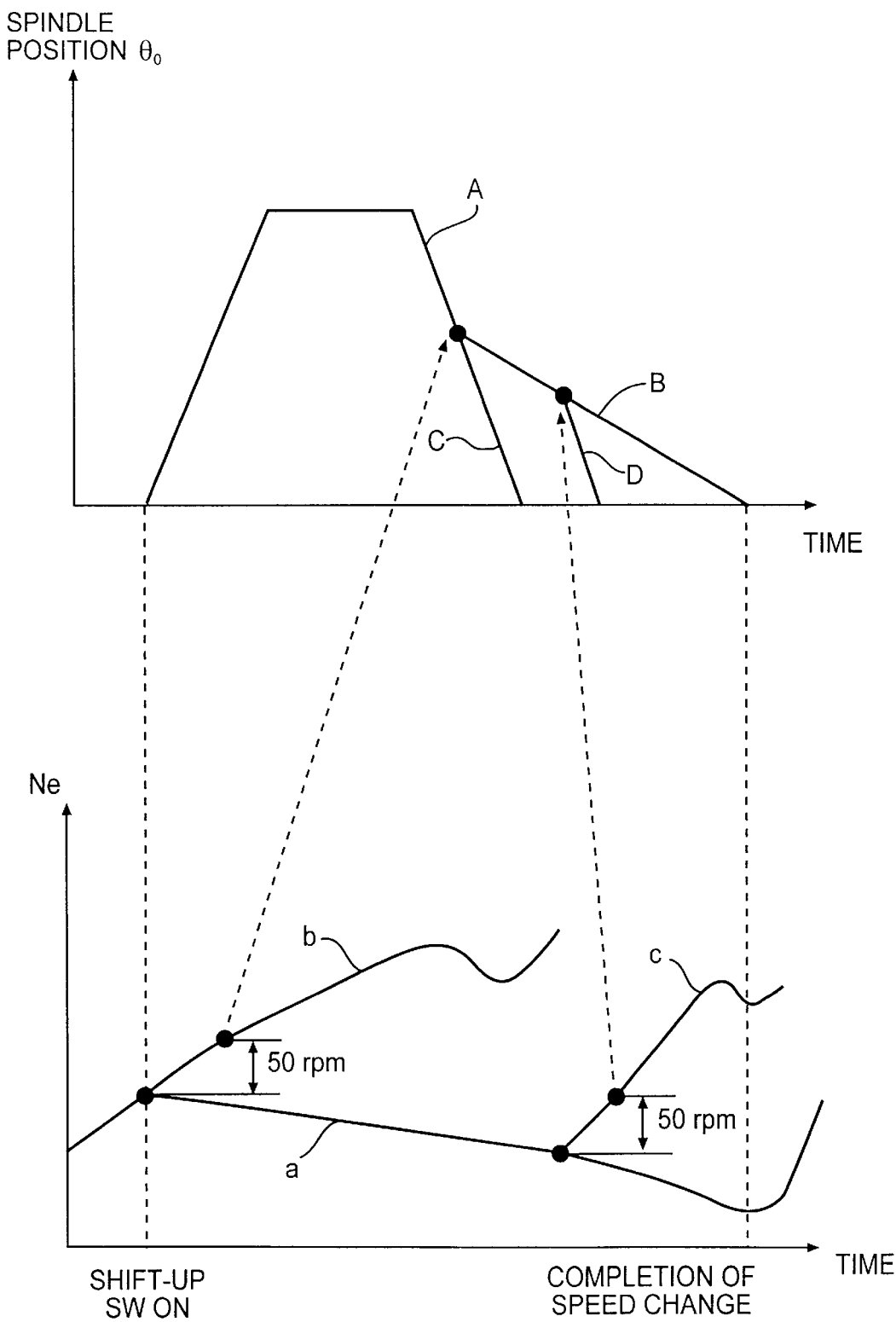
FIG. 25 is an operation timing chart (upon shifting up) of the shift spindle and the engine speed according to the present invention.

As shown in FIG. 25, upon shifting up, it is common to return the accelerator, operate the shift-up switch 51 into an on-state and then, after a shifting operation is performed, the clutch is connected again to open the accelerator. The engine speed Ne then varies as indicated by a solid line a in the figure. In this instance, the shift spindle is controlled as indicated by solid lines A and B.

However, depending upon the driver, it may possibly occur that the shift-up switch 51 is operated without returning the accelerator or the accelerator is opened before the clutch is connected again. In such an instance, since the driver wants a quick shift change, it is desirable to connect the clutch quickly.

Therefore, in the present embodiment, if the engine speed Ne varies as indicated by a solid line b, it is determined that the driver operates the shift-up switch 51 without returning the accelerator, but if the engine speed Ne varies as indicated by a solid line c, it is determined that the accelerator is opened earlier than the timing at which the clutch is connected, and quick return control for connecting the clutch immediately is executed as indicated by solid lines C and D, respectively.

Figure 26:
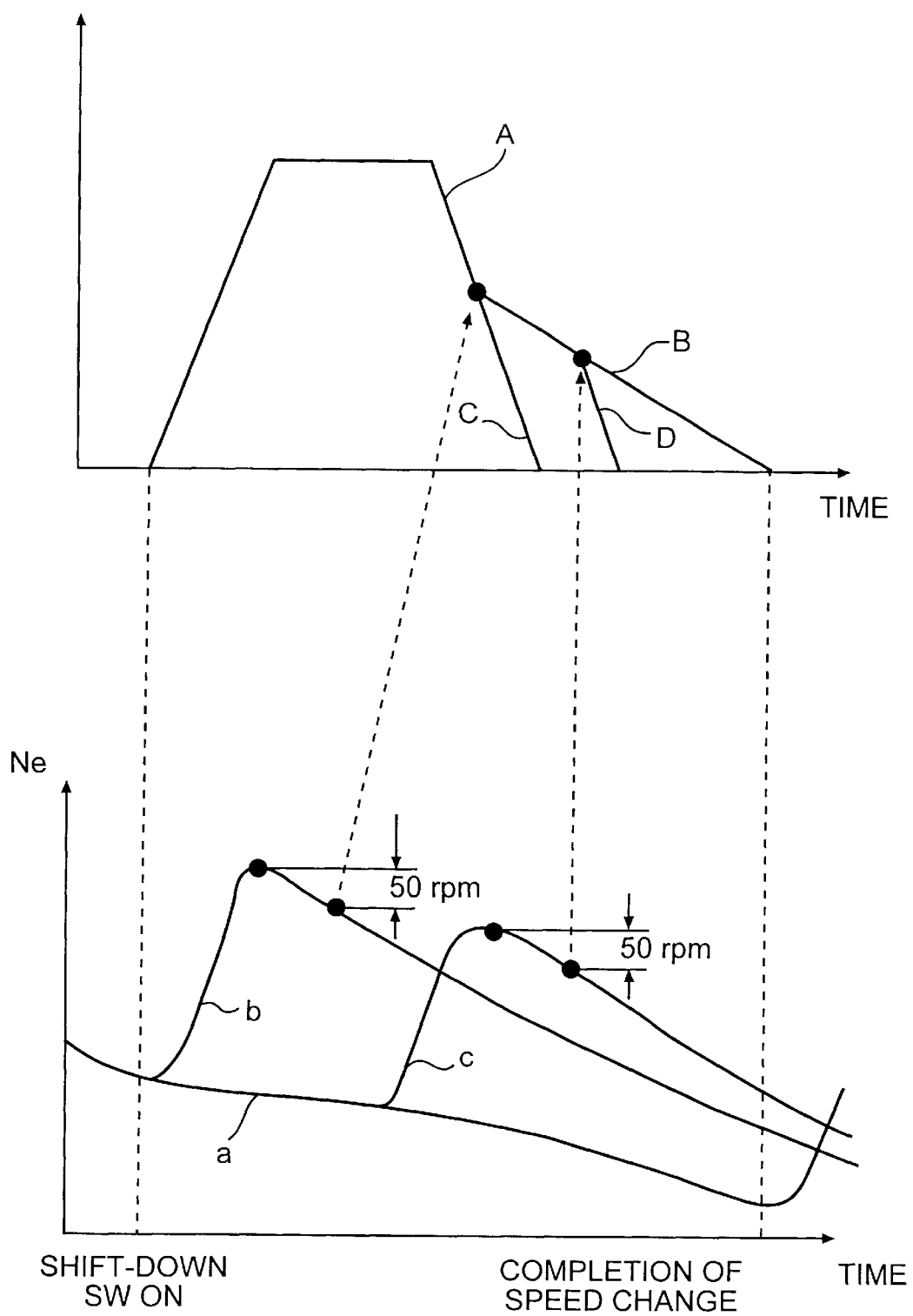
FIG. 26 is an operation timing chart (upon shifting down) of the shift spindle and the engine speed according to the present invention.

On the other hand, as show in FIG. 26, also upon shifting down, it is common to return the accelerator, operate the shift-down switch 52 into an on-state and then, after a speed changing operation is performed and the clutch is connected again to open the accelerator. The engine speed Ne in this instance varies as indicated by a solid line a in the figure. In this instance, the shift spindle is controlled in two stages as indicated by solid lines A and B.

However, upon shifting down, racing of the engine sometimes occurs. In such an instance, even if the clutch is connected rapidly, shift shock occurs. Therefore, it is desirable to connect the clutch quickly.

Therefore, in the present embodiment, when the engine speed Ne varies as indicated by a solid line b or c, it is determined that the driver causes racing of the engine, and such quick return control as indicated by a solid line C or D, respectively, is performed.

Figure 21:
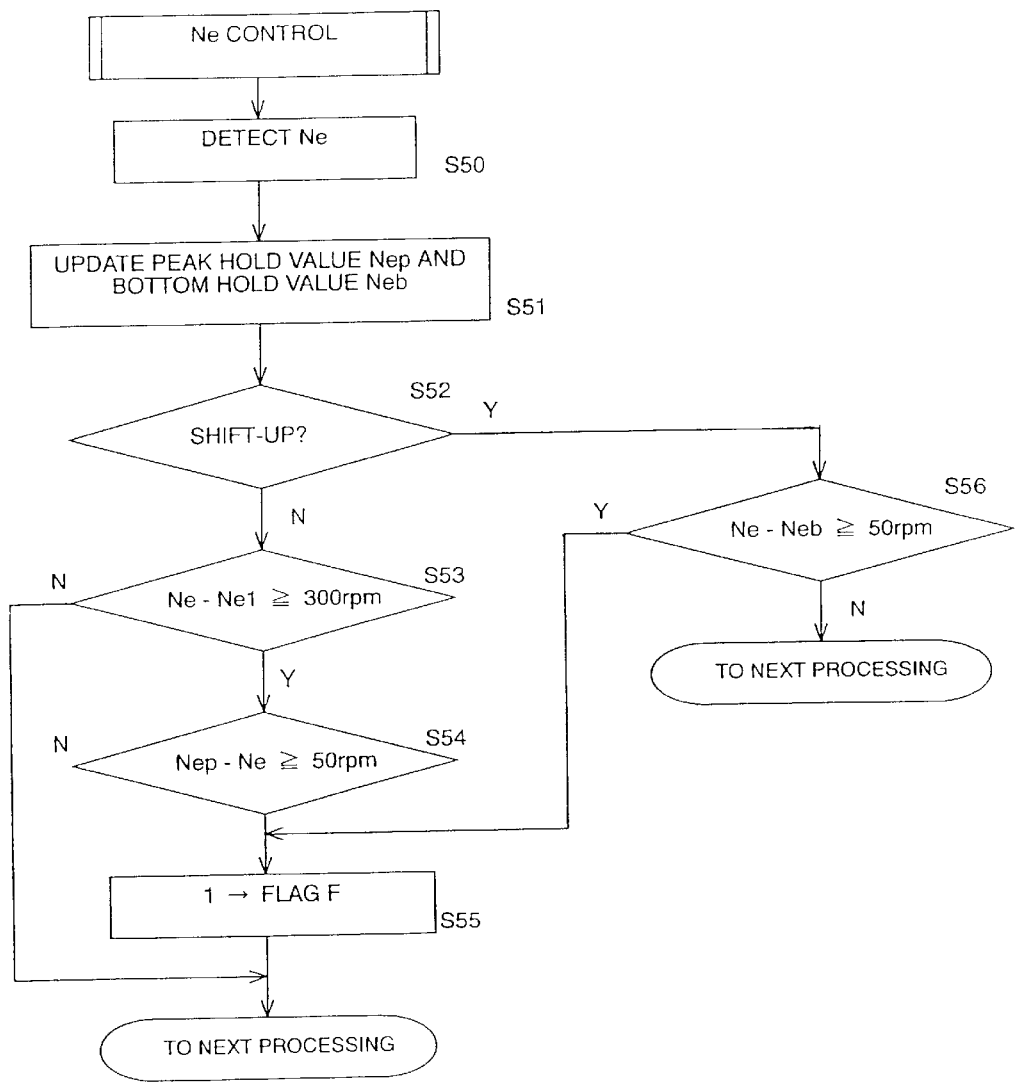
FIG. 21 is a flowchart (part 6) of an embodiment of the present invention.

Operation of the Ne control and the clutch ON control which realize the two-stage return control and the quick return control described above will now be described in detail. FIG. 21 is a flowchart illustrating a controlling method of the Ne control executed in steps S21, S26, S31 and S43 described hereinabove.

In step S50, the engine speed Ne in the present cycle is measured. In step S51, a peak hold value Nep and a bottom hold value Neb of the engine speed Ne measured until now are updated based on the engine speed Ne measured in the present cycle. In step S52, it is determined which one of a shift-up operation or a shift-down operation is proceeding. If a shift-up operation is proceeding, the processing advances to step S56. Furthermore, the processing advances to step S53, if a shift-down operation is proceeding.

In step S56, it is determined whether or not a difference (Ne−Neb) between the engine speed Ne in the present cycle detected in step S50 described above and the bottom hold value Neb updated in step S51 described above is equal to or greater than the 50 rpm.

The determination is to be made whether or not the accelerator is in a closed state upon shifting up. If the difference mentioned above is equal to or greater than 50 rpm, it is determined that the driver has operated the shift-up switch 51 without returning the accelerator, or the accelerator has been opened earlier than the time at which the clutch is connected. In this instance, the processing advances to step S55 in order to connect the clutch immediately. After a quick return flag F is set, the processing is ended. On the other hand, if the difference is smaller than 50 rpm, the engine speed control is ended without setting the quick return flag F in order to continue regular control.

On the other hand, if it is determined in step S52 described above that a shift-down operation is proceeding, then it is determined in step S53 whether or not the difference (Ne−Ne1) between the engine speed Ne in the present cycle and the engine speed Ne1 stored in step S12 described above is equal to or greater than 300 rpm. If the difference is equal to or greater than 300 rpm, then it is determined further in step S54 whether or not the difference (Nep−Ne) between the peak hold value Nep updated in step S51 described above and the engine speed of the present cycle is equal to or greater than 50 rpm.

The determination is to be made whether or not the driver has performed racing of the engine upon shifting up. If the determinations in steps S53 and S54 described above are both affirmative, then it is determined that the driver has performed racing of the engine upon shifting up. The processing then advances to step S55, in which the quick return flag F is set The processing is then ended.

Figure 22:
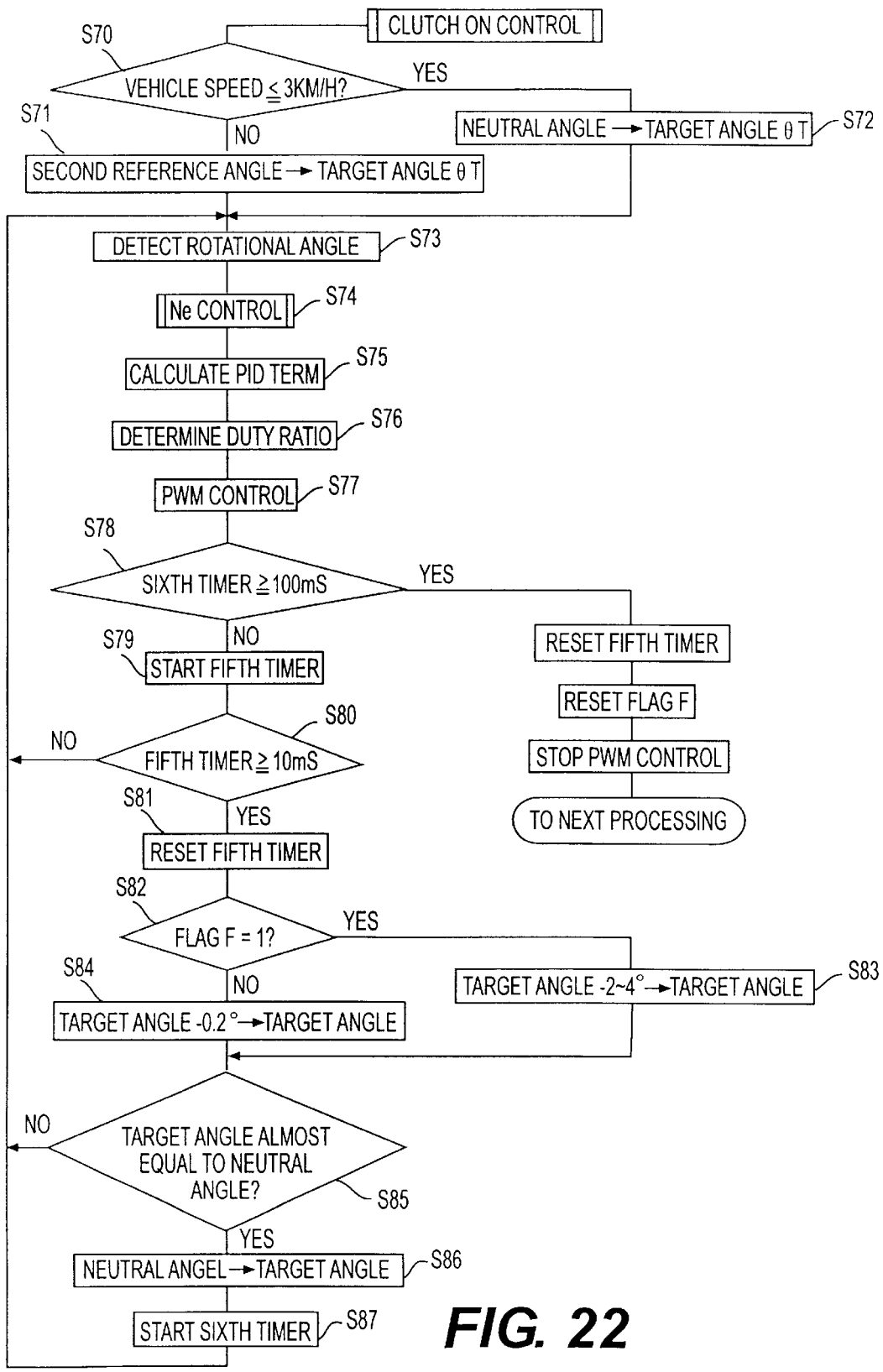
FIG. 22 is a flowchart (part 7) of an embodiment of the present invention.

FIG. 22 is a flowchart illustrating a controlling method of the clutch ON control executed in steps S28 and S36 described hereinabove.

In step S70, it is determined whether or not the vehicle speed is substantially 0. In the present embodiment, if the vehicle speed is equal to or lower than 3 km/h, then it is determined that the vehicle speed is substantially 0, and the processing advances to step S72. In step S72, the neutral position is set to a target angle $θ_r$ Of the shift spindle 3. The processing then advances to step S73. This is a shift in a condition wherein the vehicle is substantially in a stopping state. This is because shift shock does not occur and a quick shift change is desired, in such an instance.

On the other hand, if it is determined in step S70 that the vehicle speed is 3 km/h or higher, a second reference angle (that is, ±12 degrees) which is an angle spaced backwardly by 6 degrees from an angle (in the present embodiment, ±18 degrees) at which rotation of the shift spindle 3 is limited by a stopper is set to the target angle $θ_r$. The processing then advances to step S73. In step S73, the rotational angle $θ_0$ of the shift spindle 3 at present is detected by the angle sensor 28, and in step S74, the Ne control described above is executed.

In step S75, a PID addition value for proportional plus integral plus derivative (PID) control is obtained In particular, a proportional (P) term which is represented as the difference $(θ_0−θ_T)$ between the rotational angle $θ_0$ at present detected in step S73 described above and the target angle $θ_r$ an integral (I) term which is an integration value of the P term and a derivative (D) term which is a derivative value of the P term are determined individually and then added. In step S76, the duty ratio of PWM control is determined based on the PID addition value determined as described above, and in step S77, the PWM control is executed.

Figure 27:
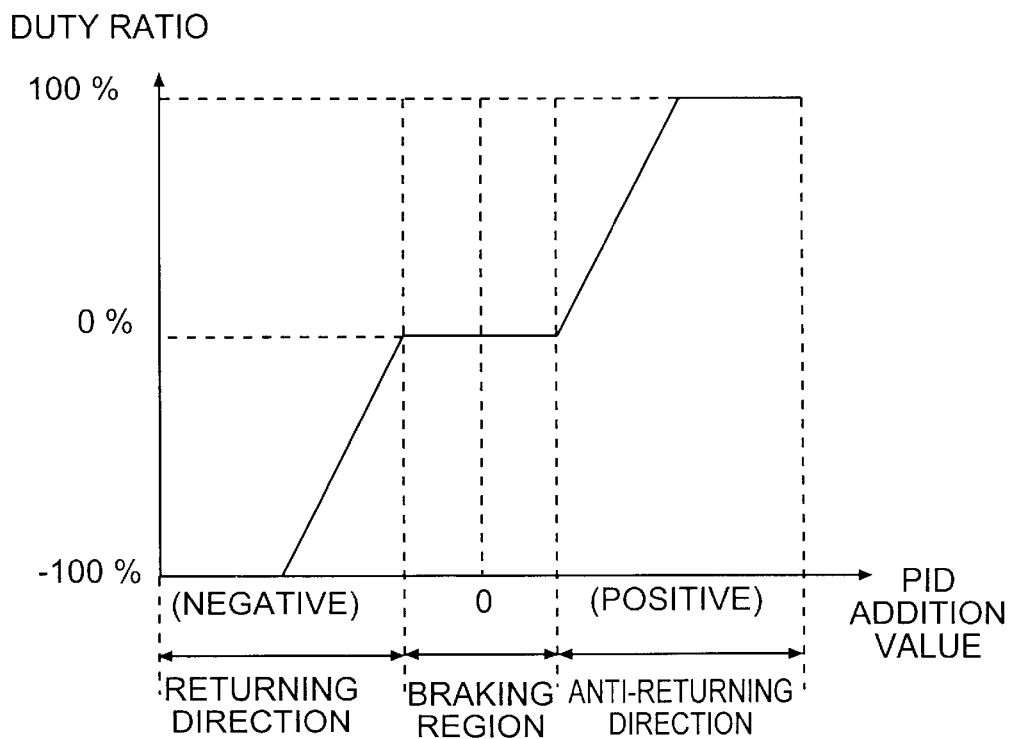
FIG. 27 is a view illustrating a relationship between a PID addition value and the duty ratio.

FIG. 27 is a view illustrating a relationship between the PID addition value described above and the duty ratio. If the polarity of the PID addition value is positive, a positive duty ratio is selected in accordance with the value. However, if the polarity of the PID addition value is negative, a negative duty ratio is selected in accordance with the value. The polarity of the duty ratio indicates a combination of the FETS to be PWM controlled. For example, a duty ratio of 50% signifies a rendering of the FET ④ to be conducting and PWM control of the FET ② with the duty ratio of 50%, while a duty ratio of −50% signifies a rendering of the FET ① to be conducting and PWM control of the FET ③ with the duty ratio of 50%.

In step S78, it is determined whether or not the counted time of the sixth timer exceeds 100 ms. Since the sixth timer has not started counting at first, the processing advances to step S79, in which counting of the fifth timer is started. In step S80, it is determined whether or not the counted time of the fifth timer exceeds 10 ms. Since initially the counted time does not exceed 10 ms, the processing returns to step S73, so that the processes in steps S73 to S80 described above are repeated.

Thereafter, when the counted time of the fifth timer exceeds 10 ms at time $t_5$ of FIG. 23, the fifth timer is reset in step S81, and it is determined in step S82 whether or not the quick return flag F is in a set state. If the quick return flag F is in a set state, an angle obtained by subtracting 2 to 4 degrees from the target angle at present is registered as a new target angle in step S83 in order to execute quick return control. If the quick return flag F is not in a set state, then another angle obtained by subtracting 0.2 degrees from the target angle at present is registered as a new target angle in step S84.

In step S85, it is determined whether or not the target angle is close to the neutral angle, and the processes in steps S73 to S85 described above are repeated until the target angle comes sufficiently close to the neutral angle. When the target angle thereafter comes sufficiently close to the neutral angle, the neutral angle is registered as the target angle in step S86, and the sixth timer starts time counting in step S87.

On the other hand, if it is determined in step S78 described hereinabove that the counted time of the sixth timer exceeds 100 ms, then the sixth timer is reset in step S90. In step S91, the quick return flag F is reset, and in step S92, the PWM control of the switching circuit 105 is ended.

It should be noted that, if the gear is shifted from its neutral position while the vehicle is running at a high speed or the engine is rotating at a high speed, a comparatively high engine brake acts and an excessively high load is applied to the engine. Therefore, the present embodiment includes a speed change inhibition system which inhibits the control of FIG. 16 described above even if the shift-up switch 51 is operated into an on-state provided that the vehicle speed is 10 km/h or higher, or the engine speed is 3,000 rpm or higher.

Figure 11:
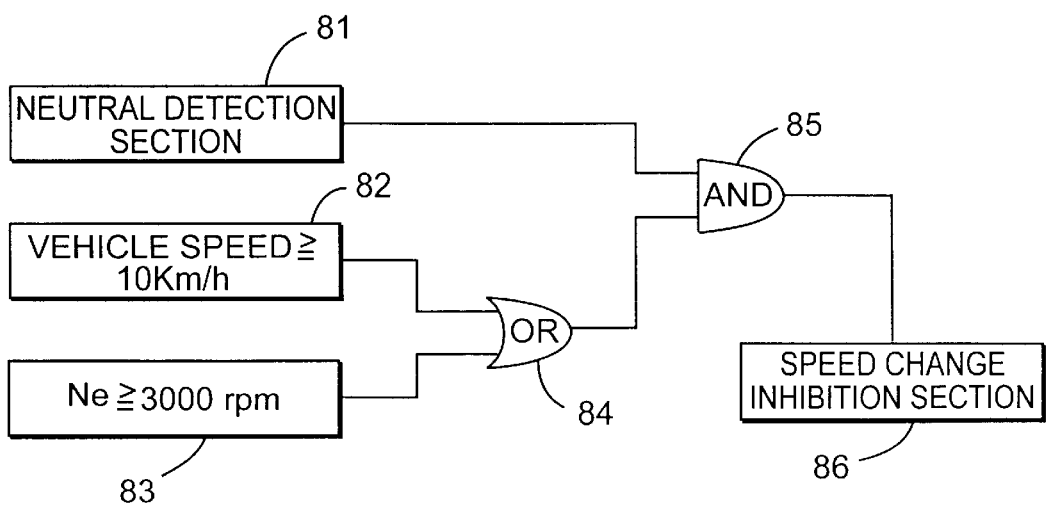
FIG. 11 is a functional block diagram of a speed change inhibition system.

FIG. 11 is a functional block diagram of the speed change inhibition system described above. A neutral detection section 81 outputs a signal of the "H" level when the gear is at the neutral position. A vehicle speed determination section 82 outputs a signal of the "H" level when the vehicle speed is 10 km/h or higher. An engine speed determination section 83 outputs a signal of the "H" level when the engine speed is 3,000 rpm or higher.

An OR circuit 84 outputs a signal of the "H" level when the output of the vehicle speed determination section 82 or the engine speed determination section 83 has the "H" level, and an AND circuit 85 outputs a signal of the "H" level when the output of the OR circuit 84 and the output of the neutral detection section 81 have the "H" level. A speed change inhibition section 86 inhibits the control of FIG. 16 described hereinabove, even if the shift-up switch 51 is operated into an on-state provided that the output of the AND circuit 85 has the "H" level.

However, if the gear is shifted to the neutral position in error while the vehicle speed is 10 km/h or higher, or the engine speed is 3,000 rpm or higher during acceleration from the velocity 1, it takes time for re-acceleration. Therefore, if the speed change inhibition system described above is additionally provided, a system for inhibiting shifting to the neutral position during driving at a running vehicle speed (for example, when the vehicle speed is 3 km/h or higher) may be further provided additionally.

According to the present invention, the following effects are achieved.

(1) If a speed change gear shaft is rocked to a rotational limit on one side or on the other side, since a middle point (neutral position) of the speed change gear shaft is determined based on rotational angles of the speed change gear shaft, an accurate neutral position is always determined.

(2) Since the allowable range for determination of the reasonability of a detected rotational angle is narrowed as detection of the neutral position of the speed change gear shaft proceeds, even if a wrong rotational angle is input due to an influence of noise or the like, this can be removed and the removing capacity is gradually increased.

Furthermore, since the allowable range is gradually widened each time a rotational angle which exceeds the allowable range is detected, even if a value higher than ever is detected as a rotational angle because of, for example, deterioration of an angle sensor or the like, a situation where the value is repetitively removed as a wrong rotational angle is prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method for determining a neutral position of a speed change gear shaft for an electrically operated speed change gear, said electrically operated speed change gear including a speed change gear shaft rockable to one side or another side by a drive motor and an angle sensor for detecting a rotational angle of said speed change gear shaft for executing a predetermined speed change control based on a rocking direction and a rocking angle from a neutral position of said speed change gear shaft, said method comprising the steps of:

detecting rotational angles of said speed change gear shaft when said speed change gear shaft is rocked to a rotational limit on said one side and a rotational limit on said another side; and determining a middle point of a rotational angle detected from said rotational limit on said one side and said rotational limit on said another side to be a neutral position of said speed change gear shaft.

2. The method according to claim 1, further comprising the steps of:

determining whether or not each of the detected rotational angles is within a predetermined allowable range; and comparing each of the detected rotational angles with a maximum rotational angle; and updating the rotational angles as maximum angles on said one side and another side.

3. The method according to claim 2, further comprising the steps of:

calculating a correction value for said predetermined allowable range;

adjusting said predetermined allowable range on said one side or another side.

4. The method according to claim 2, wherein said predetermined allowable range and said maximum rotational angles are stored in a memory, and said step of updating further comprises the step of updating the memory to include said detected rotational angles as said maximum angles on said one side and another side.

5. The method according to claim 1, wherein said method further comprises the step of updating in a memory said middle point of said rotational angle to be the neutral position of said speed change gear shaft.

6. The method according to claim 5, wherein said step of updating further comprises the step of updating said middle point in a registration in said memory.

7. A method of determining a neutral position of a speed change gear shaft for an electrically operated speed change gear, said electrically operated speed change gear including a speed change gear shaft rockable to one side or another side by a drive motor and an angle sensor for detecting a rotational angle of said speed change gear shaft for executing a predetermined speed change control based on a rocking direction and a rocking angle from a neutral position of said speed change gear shaft, said method comprising the steps of:

detecting rotational angles of said speed change gear shaft when said speed change gear shaft is rocked to a rotational limit on said one side and a rotational limit on said another side;

determining whether or not each of the detected rotational angles is within an allowable range;

updating the rotational angles in registration as maximum angles on said one side and another side and reducing the allowable range on said one side or another side if the rotational angles are within the respective allowable ranges;

expanding the allowable range on said one side or another side if any of the rotational angles is not within the allowable range; and determining a middle point between the maximum angles on said one side and the other side to be a neutral position of said speed change gear shaft.

8. The method according to claim 7, further comprising the steps of:

comparing each of the detected rotational angles with a maximum rotational angle; and calculating a correction value for said predetermined allowable range.

9. The method according to claim 7, wherein said method further comprises the step of updating in a memory said middle point between the maximum angles to be the neutral position of said speed change gear shaft.

10. The method according to claim 11, wherein said step of updating further comprises the step of updating said middle point in a registration in said memory.

11. A method of determining a neutral position of a speed change gear shaft for an electrically operated speed change gear, said method comprising the steps of:

detecting the rotational angle of said speed change gear shaft;

determining if a shift-up operation or a shift-down operation is proceeding;

determining whether the detected rotational angle is a regular value without noise components if a shift-up operation is proceeding by determining whether or not the detected rotational angle is within a predetermined allowable angle range;

comparing the detected rotational angle with a maximum rotational angle for shifting-up; and calculating a correction value for said predetermined allowable range; and adjusting said predetermined allowable range.

12. The method according to claim 11, wherein said predetermined allowable range is stored in a memory, and said step of adjusting further comprises the step of adjusting said predetermined allowable range in said memory.

* * * * *

UNITED STATES PATENT AND TRADEMARK OFFICE
CERTIFICATE OF CORRECTION

PATENT NO. : 6,249,734 B1  
DATED : June 19, 2001  
INVENTOR(S) : Atsuo Ota

Page 1 of 1

It is certified that error appears in the above-identified patent and that said Letters Patent is hereby corrected as shown below:

<u>Title page,</u>  
Item [30], Foreign Application Priority Data, please correct the priority date from "Oct. 7, 1998" to -- July 10, 1998 --.

Signed and Sealed this

Ninth Day of April, 2002

Attest:

Attesting Officer

JAMES E. ROGAN  
Director of the United States Patent and Trademark Office